United States Statutory Invention Registration [19]

[11] Reg. Number: H431

Miller [43] Published: Feb. 2, 1988

[54] PORTABLE LABORATORY FOR DETECTION AND MONITORING OF HAZARDOUS CHEMICALS

[75] Inventor: Robert A. Miller, Bel Air, Md.

[73] Assignee: The United States of America as represented by the Secretary of the Army, Washington, D.C.

[21] Appl. No.: 936,061

[22] Filed: Nov. 28, 1986

[51] Int. Cl.[4] ..... G01J 1/00

[52] U.S. Cl. ..... 250/336.1; 250/282

*Primary Examiner*—Deborah L. Kyle
*Assistant Examiner*—Richard W. Wendtland
*Attorney, Agent, or Firm*—Anthony T. Lane; Harold H. Card, Jr.; Michael C. Sachs

[57] ABSTRACT

This invention relates to a system for detecting, identifying, and quantifying hazardous chemicals and radioactive areas, gathering water and soil samples for later analysis and marking contaminated areas under battlefield condition.

The invention is comprised of a laboratory enclosure, a viewing port, a non-contact sampling means, a non-contact testing means and a non-contact marking means. Because the system is installed in a protective environment which offers higher electrical power, a highly sophisticated mass spectrometer can be used having the capability to detect, measure and identify known and unknown hazardous chemicals. On-the-move analysis and marking is possible, and operator exposure is reduced. The enclosing of the system also prevents system operation detection.

3 Claims, 6 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PORTABLE LABORATORY FOR DETECTION AND MONITORING OF HAZARDOUS CHEMICALS

GOVERNMENT INTEREST

The invention described herein may be manufactured, used and licensed by or for the Government for Governmental purposes without the payment to me of any royalties thereon.

BACKGROUND AND SUMMARY OF THE INVENTION

Since the first use of Chemical Warfare in World War I, problems have existed with the detection and monitoring of hazard chemicals. Using the existing procedures, personnel in full protective overgarments, riding in an open jeep, dismount and manually sample the area using chemical agent detector paper and chemical agent sampling kits to find hazardous chemicals. Vapor contamination is monitored by a chemical agent alarm. Marking of the hazardous area consists of hanging signs from available fences, vegetation, and structures, or hammering a flag support stake into the ground.

The problems inherent in the existing system are numerous. First, the persons sampling for hazards must be dismounted, making them vulnerable to the chemicals they are searching for and unprotected against enemy weapon fire. In addition, the present chemical identification is limited to those commonly known agents that can be monitored by existing kits and paper. Also, the personnel conducting the chemical survey must be stationary during the chemical monitoring and must dismount to perform most marking operations, and the surveying vehicle must be stopped during the time sample is being processed to prevent penetration of the contaminated area. Further, the persons taking samples around the survey vehicle are quite conspicuous and any vehicle such as a jeep working with an armored vehicle draws unwanted attention. Finally, the present soil and water sample collection and storage techniques are not supported by standardized containers or a dedicated storage area.

The instant invention overcomes the various undesirable consequences which attend the existing equipment and methodology for detection and monitoring of hazardous chemicals. The system is installed in a protective environment which offers higher electrical power, a highly sophisticated mass spectrometer can be used having the capability to detect, measure and identify known and unknown hazardous chemicals.

On-the-move analysis is now possible because of the shorter analysis time of the mass spectrometer and the ability to sample and analyze is at the same time. Marking on-the-move is now possible using weighted base marking flags which stand upright regardless of release orientation. Sampling capability is greatly increased by the use of the mass sprectrometer which can identify known agents and can easily be programmed in the field to identify unknown chemicals. The quicker response time of the detector and the ability to sample and analyze concurrently, while on the move, also increases sampling capabilities. The laboratory enclosure prevents outsiders from identifying system operation. Material samples can be taken with sealed containers and stored on the inside of the blast shield in built-in holders.

It is an object of this invention, therefore, to provide a system for detecting, identifying, and quantifying hazardous chemicals and radioactive areas, gathering water and soil samples for later analysis and marking contaminated areas under battlefield conditions.

Another object of this invention is to provide a system which protects the operator from hazardous chemicals and hostile gunfire.

It is another object of this invention to provide for greatly increased chemical identification capability.

Still another object of this invention is to allow for on-the-move analysis and marking of chemical and toxic areas.

It is another object of this invention to provide a system for increased sampling capability of chemicals and toxins.

Another object of this invention is to provide a system which prevents outsider from determining system operation.

It is still another object of this invention to provide a system for sample collection and storage. Further objects and advantages of this invention will become more apparent in light of the following drawings and description of the preferred embodiment of the invention.

DESCRIPTION OF THE PREFERRED EMBODIMENTS OF THE INVENTION

Figure 1:
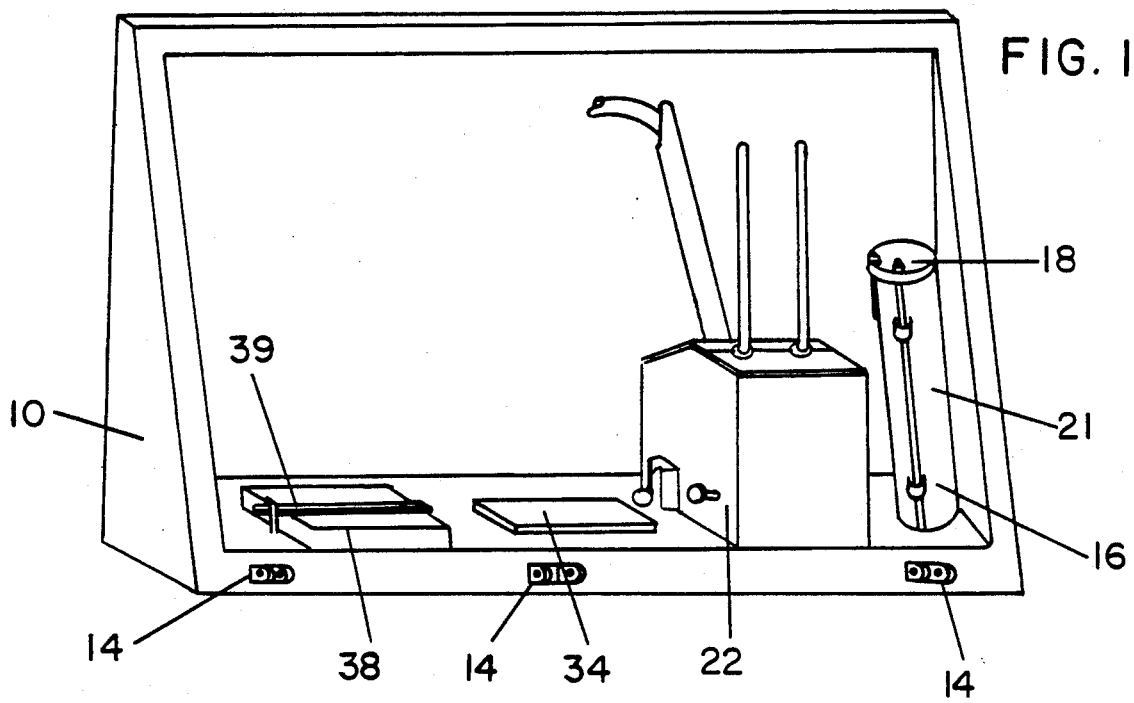
FIG. 1 is a frontal perspective view of the embodiment of the system for detecting, identifying, and quantifying hazardous chemicals and radioactive areas, gathering water and soil samples for later analysis and marking contaminated areas under battlefield conditions.
Figure 2:
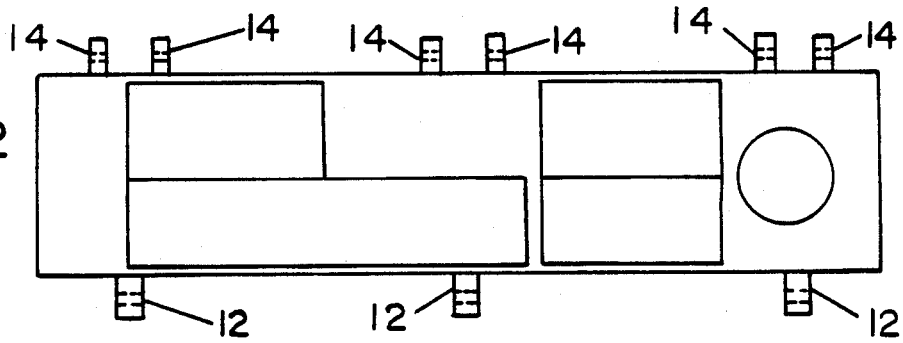
FIG. 2 is a plan view of the bottom of FIG. 1.

Referring to FIGS. 1 to 6 of the drawings, there is a system shown embodying the principles of this invention. The embodiment of the invention consists of a laboratory enclosure 10 which can be constructed of two layers of one-half inch (½") aluminum fashioned into a ring which extend the floor of a test vehicle by, for example, ten (10) inches. The laboratory closure 10 is provided with hinge pin hooks 12 which allow it to be installed on an armored personnel carrier using existing ramp hinges points.

The ramp (not shown) is then reattached to the laboratory enclosure 10 using hinge points 14 built into the laboratory enclosure 10. Inside the laboratory enclosure 10 is equipped with a marker dropping chute 16, which has sealed doors 18 and 19 at each end and a positive locking system 20 allowing only one door 18 or 19 to be open at a time.

Figure 6:
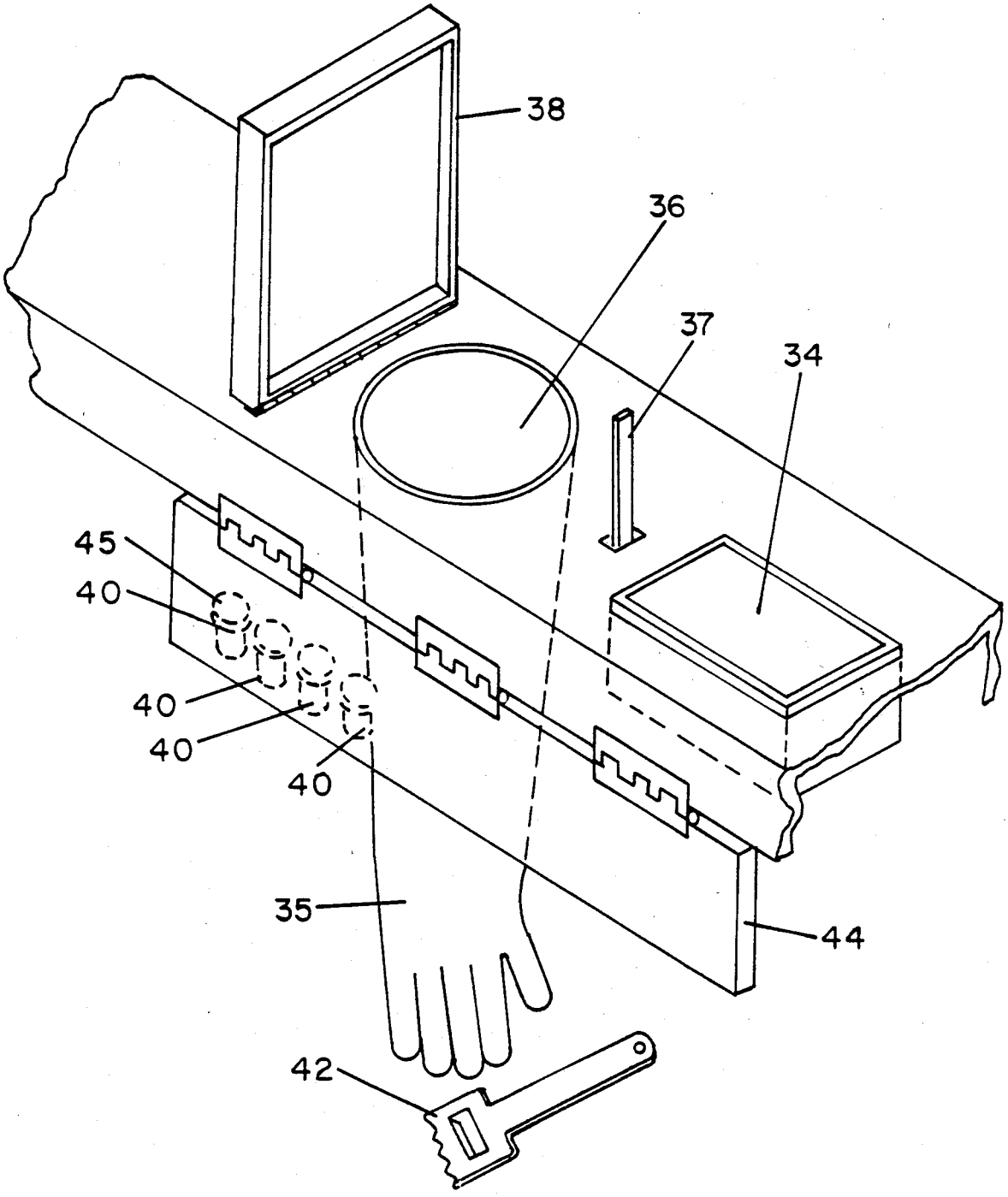
FIG. 6 is a perspective view of a gloveport/viewing block of the invention.

A sample wheel box 22 is provided and it contains two sampling wheel holders 24, a mass spectrometer probe 26, a wheel positioning cradle 28 and a new wheel loading slot 30. The outside access for the sample wheel box 22 is through sealed blast doors 32 which are activated from inside of the enclosure 10 by a door activator 37. A ballistically protected viewing port 34, shown in FIGS. 1 and 6, is installed in the base of the enclosure 10 to facilitate the taking of physical samples.

A glove port 36 which allows the operator to directly collect samples of soil and water is located under a hinged protective cover 38 in the base of the laboratory enclosure 10. The port 36 also allows access to soil sample cups 40 and a scraper 42 which are mounted on the inside of internally operated blast doors 44 which also protect the viewing port 34.

Figure 5:
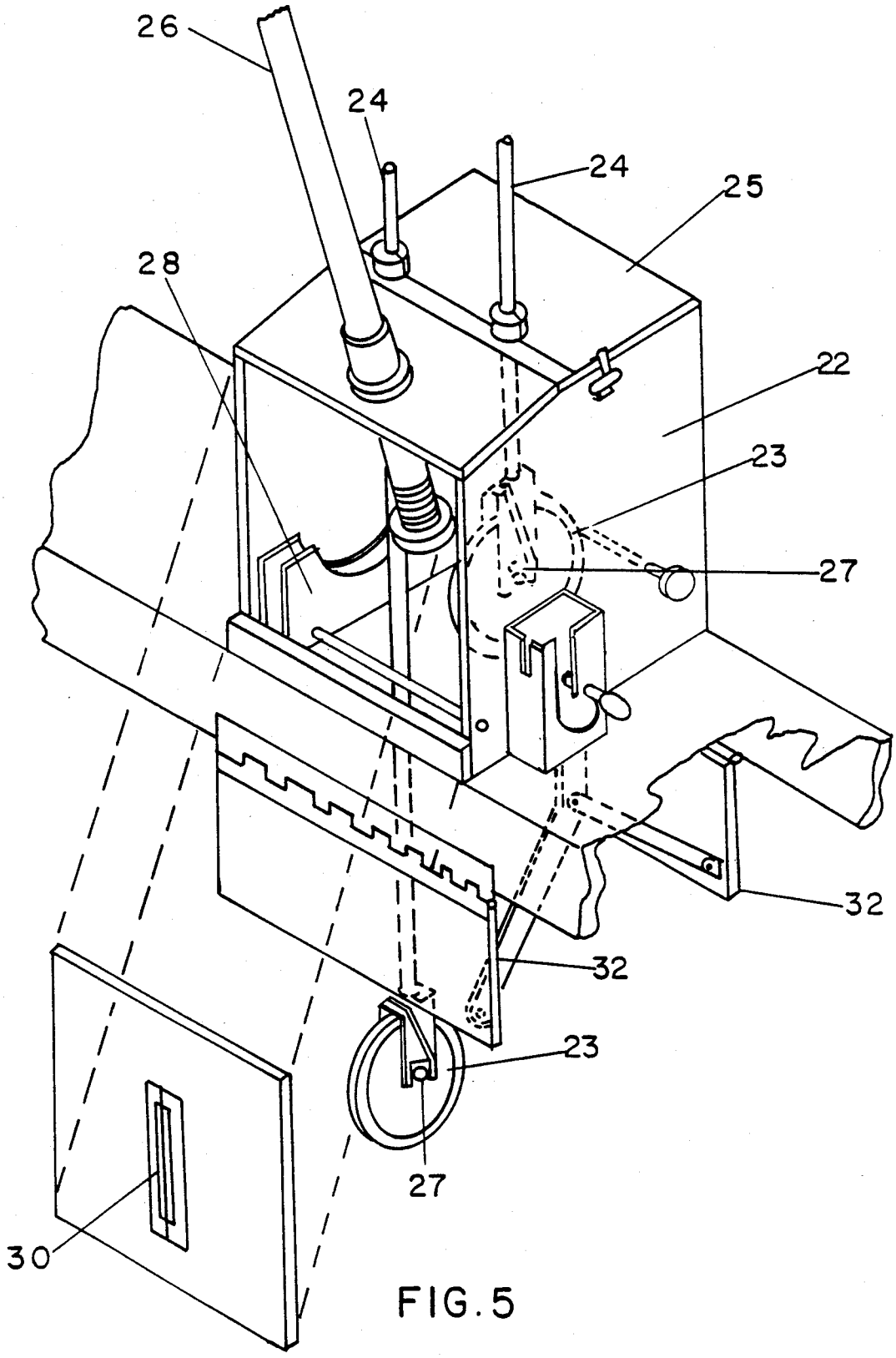
FIG. 5 is a perspective view of a sample wheel box of the invention.

Referring now to FIG. 5, the operation of the invention will be discussed. Clean sampling wheels 23 are placed on the wheel holders 24 and the wheel holders 24 are loaded into the sample wheel box 22 through the hinged top of the box 25. Blast shield doors 32 are opened and one wheel 23 is lowered to the ground.

After an appropriate distance is traveled by the test vehicle (not shown), the second wheel 23 is lowered and the first wheel 23 is raised and positioned under and against the mass spectrometer probe 26. This process is repeated until a source of contamination is discovered. After a contaminated wheel 23 is analyzed, it is disposed of by raising the wheel holder 24 to its top limit which releases a catch 27 allowing the wheel 23 to drop to the ground.

The wheel cradle 28 is normally positioned in front of the loading slot 30, allowing a new wheel 23 to be inserted through the loading slot 30 into the wheel cradle 28. The wheel cradle 28 is then positioned under the empty wheel holder 24 which is then lowered over the wheel 23.

A downward pressure on the wheel holder 24 activates latches 27 which secure the new wheel 23 to the wheel holder 24. To define the edge of contamination, the test vehicle stops and the probe 26 is lowered into contact with the ground.

This stop and sample procedure is used when close limits of contamination are required. The probe 26 is fitted with a switch which activates a warning light on the driver's console cautioning the driver not to move the vehicle when the probe 26 is extended.

Turning now to FIG. 6, if the decision is made to collect a soil sample of the contamination for later analysis, the glove port 36 is used. The cover on the viewing block 34 is opened. The blast shield doors 44 are opened by unlatching the handle 39, shown in FIG. 1, over the glove port cover 38, and then pushing down on the activator 37. For operator safety, a light is activated on the driver's console warning him not to move the test vehicle during the sampling process. The hinged glove port cover 38 is raised and the operator, in a prone position, places his hand and arm in the glove 35. A clean, numbered sample cup 40 is unclipped from the inside of the blast shield door 44 and the hinged lid 45 is opened.

Observing through the viewing port 34 a sample is taken by the operator using the sample cup 40 as a scoop. If the ground is hard, the scraper 42 is used to loosen the soil. The sample cup 40 is then closed and returned to its holder. After the collection process is completed, the glove 35 is withdrawn and stowed, the hinged glove port cover 38 is closed and blast shield doors 44 are closed and latched.

Figures 3, 4:
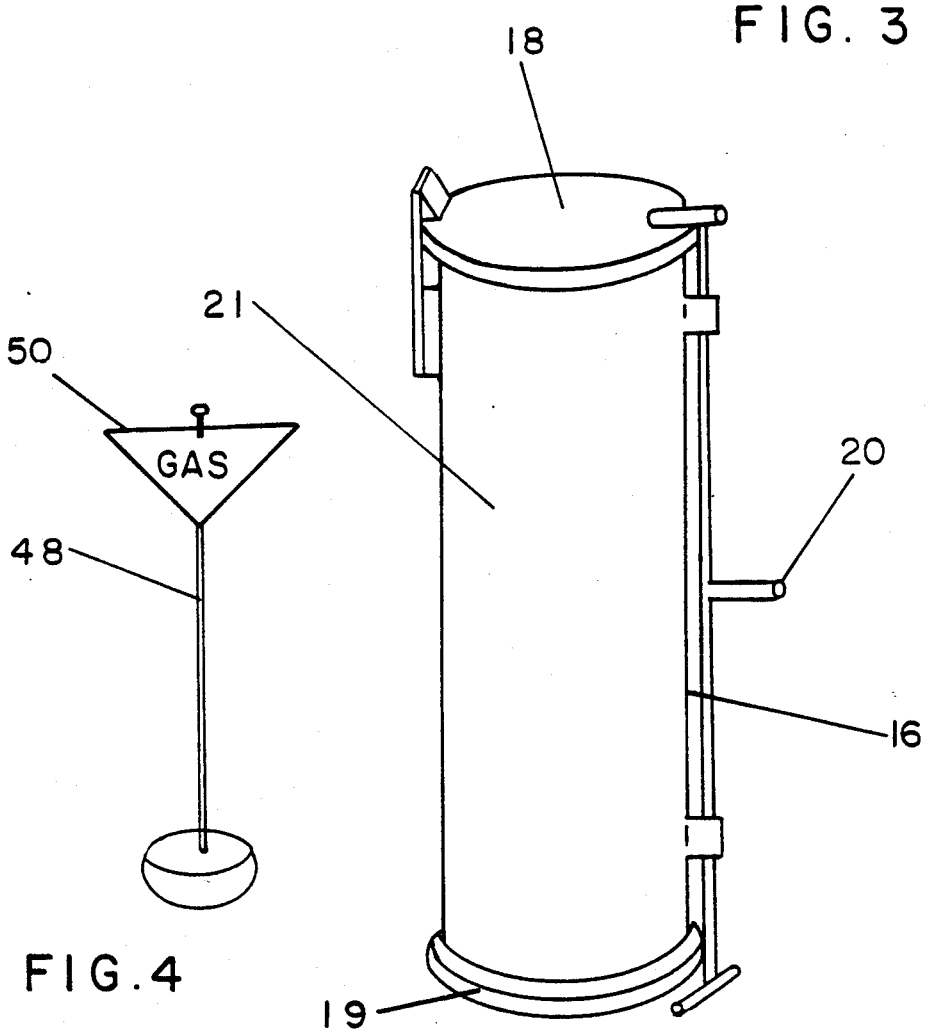
FIG. 3 is a perspective view of a marker dropping chute used in the invention.
FIG. 4 is a perspective view of a warning flag used in the invention.

Referring to FIGS. 3 and 4, once an area of contamination is discovered, it is marked by dropping a weighted base marking flags 48. Using a china marker (not shown), the back of an assembled flag 50 is marked with date and contamination information, the upper door 18 is unlatched and the flag 48 is inserted into the tube 21. The upper door 18 is closed and the positive locking system 20 is activated allowing the bottom door 19 to be opened, dropping the flag 48 out onto the ground. The bottom door 19 is closed and the positive locking system 20 is reset so the procedure can be repeated.

Accordingly, modifications and variations to which the invention is susceptible may be practiced without departing from the scope and intent of the appended claims.

What is claimed is:

1. A method for detecting, sampling, identifying, and quantifying harardous chemicals and radioactive areas, without physical contact, comprising obtaining a sample of material for on-the-spot testing, and testing said contaminated material spectroscopically.

2. The method as set forth in claim 1, comprising obtaining a secured sample of test material for remote testing of said material.

3. A method of non-contact marking of a contaminated, area, comprising marking of a contaminated area with an indicating device, and discharging said indicating device in a contaminated area so as to make it visible.

* * * * *